US012600864B2

(12) United States Patent
Duan et al.

(10) Patent No.: US 12,600,864 B2
(45) Date of Patent: Apr. 14, 2026

(54) IMPURITY REMOVAL AND MODIFICATION METHOD FOR PYROLYSIS CARBON BLACK OF WASTE TIRES

(71) Applicant: QINGDAO UNIVERSITY OF SCIENCE AND TECHNOLOGY, Qingdao City (CN)

(72) Inventors: Yongxin Duan, Qingdao City (CN); Zhengqing Kong, Qingdao City (CN); Jie Hu, Qingdao City (CN); Ke Liu, Qingdao City (CN); Lijuan Zhou, Qingdao City (CN); Yunxiao Liu, Qingdao City (CN)

(73) Assignee: QINGDAO UNIVERSITY OF SCIENCE AND TECHNOLOGY, Qingdao City (CN)

( * ) Notice: Subject to any disclaimer, the term of this patent is extended or adjusted under 35 U.S.C. 154(b) by 476 days.

(21) Appl. No.: 18/295,971

(22) Filed: Apr. 5, 2023

(65) Prior Publication Data

US 2023/0242769 A1 Aug. 3, 2023

Related U.S. Application Data

(63) Continuation of application No. PCT/CN2021/089897, filed on Apr. 26, 2021.

(30) Foreign Application Priority Data

Oct. 24, 2020 (CN) .......................... 202011150848.4

(51) Int. Cl.
C09C 1/56 (2006.01)
C09C 1/48 (2006.01)

(52) U.S. Cl.
CPC ................ C09C 1/56 (2013.01); C09C 1/482 (2013.01)

(58) Field of Classification Search
CPC ........... C09C 1/487; C09C 1/56; C09C 1/565; C09C 1/482
See application file for complete search history.

(56) References Cited

U.S. PATENT DOCUMENTS

| | | | | | |
|---|---|---|---|---|---|
| 2,439,442 | A | * | 4/1948 | Amon | ...................... C09C 1/56 |
| | | | | | 524/495 |
| 2005/0204957 | A1 | * | 9/2005 | Momose | .............. C09D 11/324 |
| | | | | | 106/31.86 |
| 2007/0072984 | A1 | * | 3/2007 | Sandstrom | ............... C08K 5/01 |
| | | | | | 524/495 |

FOREIGN PATENT DOCUMENTS

| | | |
|---|---|---|
| CN | 103642281 A | 3/2014 |
| CN | 105854804 A | 8/2016 |
| CN | 108383916 A | 8/2018 |
| CN | 111063900 A | 4/2020 |

OTHER PUBLICATIONS

A Chaala, et al; Acid-base method for the demineralization of pyrolytic carbon black; Fuel Processing Technology, vol. 46, No. 1, pp. 1-15; 1996; Elsevier Science BV, NL.

* cited by examiner

*Primary Examiner* — Stuart L Hendrickson
(74) *Attorney, Agent, or Firm* — HAUPTMAN HAM, LLP

(57) ABSTRACT

Disclosed is an impurity removal and modification method for pyrolysis carbon black of waste tires, the method comprising: dispersing pyrolysis carbon black of waste tires in an alkali solution of potassium ferrate; adding hypohalite; leaving to stand for layering; and performing centrifugation and washing on a lower-layer slurry to obtain a stably dispersed pyrolysis carbon black/water suspension. This modification method can be operated simply and easily; and by means of the method, ash in pyrolysis carbon black of waste tires can be effectively removed, and the pyrolysis carbon black is then stably dispersed in water. In addition, the modification method is low in production cost, and is green and environmentally friendly, and a waste liquid thereof can be recycled.

9 Claims, 1 Drawing Sheet

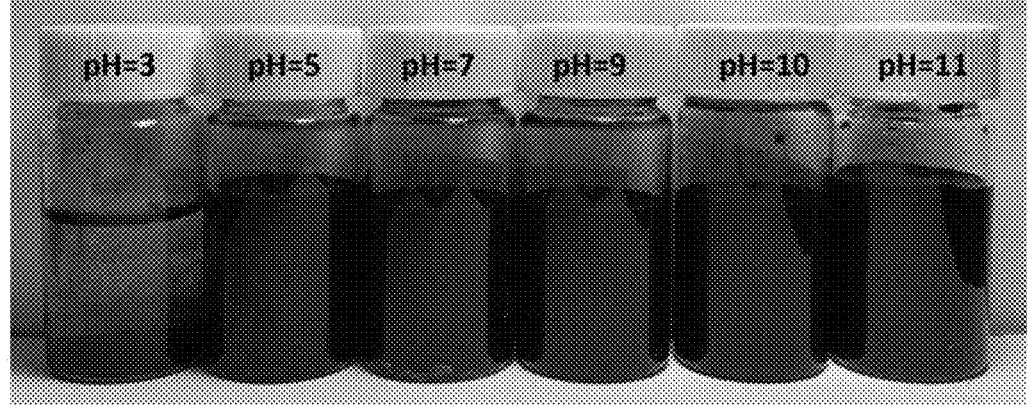

IMPURITY REMOVAL AND MODIFICATION METHOD FOR PYROLYSIS CARBON BLACK OF WASTE TIRES

CROSS-REFERENCE

The present application is a Continuation of International Application No. PCT/CN2021/089897 filed Apr. 26, 2021, which claims priority to Chinese invention application No. 202011150848.4, filed on Oct. 24, 2020. The disclosures of the above International and Chinese patent applications are hereby incorporated by reference in their entireties as a part of the present disclosure.

TECHNICAL FIELD

The present disclosure belongs to the technical field of materials, and specifically relates to a method for impurity removal and modification of pyrolysis carbon black from waste tires.

BACKGROUND ART

The rapid development of transportation industry has brought great convenience to people's production and life, but the output of waste tires is increasing, which is called black pollution in the industry. The recycling and disposal of waste tires have always been a worldwide problem. Pyrolysis of waste tires is considered in the industry to be the best way for recycling waste tires. By means of pyrolysis, waste tires can be pyrolyzed into products in three states: solid, liquid and gas. The key for promoting the development and wide application of the waste tire pyrolysis technology lies in the efficient and comprehensive utilization of the pyrolysis product, particularly the high-value comprehensive utilization of pyrolysis carbon black, which accounts for about 35% of the pyrolysis product.

The pyrolysis carbon black has the problems of high inorganic ash content (about 10%-20%), large particle size, wide particle size distribution, low structuredness and poor surface activity, which cannot meet the standards of industrial carbon black and restricts the high value-added application of pyrolysis carbon black.

At present, in the research at home and abroad, with regard to the pyrolysis carbon black modification technology, there are four modification means: ultrafine pulverization modification, acid/alkali washing treatment, plasma treatment, and surface grafting modification. Wherein the ultrafine pulverization modification can only reduce the particle size of carbon black, and cannot remove ash; the acid/alkali washing treatment can remove ash, but produces a large amount of waste liquid and causes great environmental pollution; and the plasma treatment and the surface grafting modification can only improve the surface activity, but cannot remove ash, and are currently in the laboratory research stage, not applicable in industry.

ZHANG Qiulin et al. (CN 109705635 A) of Kunming University of Science and Technology reveals that pyrolysis carbon black is added to an organic weak acid (citric acid and glacial acetic acid) solution for disposal; LIU Li et al. (CN 103923499 A) of Beijing University of Chemical Technology reveals performing acid pickling and oxidation on pyrolysis carbon black calcined at high temperature as a raw material by using $KMnO_4$, $NaNO_3$ and concentrated $H_2SO_4$ as oxidants; and ZHANG Ruiyong (CN 107952260 A) reveals that pyrolysis carbon black is disposed by adjusting the technological process by means of the combined use of an acid solution and an alkali solution. Although the performance(s) of the disposed pyrolysis carbon black is/are improved to a certain extent, the waste liquid generated in the modification process cannot be recycled, causing environmental pollution.

The prior art cannot achieve the impurity removal and modification of pyrolysis carbon black without bringing environmental pollution. Therefore, it is of great significance to develop a method for impurity removal and modification of pyrolysis carbon black from waste tires and for waste liquid recycling.

It should be noted that the information disclosed in the background above is only used for enhancing the understanding of background in the present disclosure, and therefore it may contain information that does not form the prior art that is known to a person of ordinary skill in the art.

SUMMARY OF THE INVENTION

In order to achieve the impurity removal and modification of pyrolysis carbon black without bringing environmental pollution, the present disclosure provides a method for the impurity removal and modification of pyrolysis carbon black from waste tires, wherein an alkaline reaction system of a potassium ferrate solution is constructed, and by alkali washing and oxidizing and obtaining a stably-dispersed pyrolysis carbon black/water suspension, the recycling of waste liquid obtained after the reaction is achieved.

The present disclosure discloses dispersing pyrolysis carbon black from waste tires in an alkaline solution of potassium ferrate, adding hypohalite, leaving the resulting mixture to stand for deposition, and centrifuging and washing the sediment to obtain a stably-dispersed pyrolysis carbon black/water suspension.

This modification method is simple and easy to operate, can effectively remove the ash in pyrolysis carbon black from waste tires, and makes the pyrolysis carbon black stably disperse in water. Moreover, the modification method has low production cost and is environmentally friendly, and the waste liquid can be recycled.

In order to achieve the recycling of waste liquid, preferably, the method further comprises: collecting and mixing the supernatant obtained after deposition and the supernatant obtained after centrifugation, then dispersing the pyrolysis carbon black from waste tires in the mixed waste liquid, adding hypohalite in stages in the reaction process, leaving the resulting mixture to stand for deposition, and centrifuging and washing the sediment to obtain the stably-dispersed pyrolysis carbon black/water suspension.

Preferably, when the alkaline solution of potassium ferrate is prepared, the alkali used comprises one or more selected from the group consisting of sodium hydroxide, potassium hydroxide, calcium hydroxide, magnesium hydroxide, barium hydroxide, aluminum hydroxide, zinc hydroxide, copper hydroxide, potassium bicarbonate and sodium bicarbonate; and the alkaline solution has a concentration of 0.1-5 M.

Preferably, the potassium ferrate has a mass percentage concentration of 2-10% in the alkaline solution of potassium ferrate.

Preferably, the hypohalite has a mass percentage concentration of 20-30% in the hypohalite solution, and the volume ratio of the alkaline solution of potassium ferrate to the hypohalite is 2-10:1; and a method for adding the hypohalite is as follows: the hypohalite is added twice on average, wherein the hypohalite is added once 1 h after the start of the reaction, and the remaining hypohalite is added 1 h before the end of the reaction.

Preferably, the mass ratio of pyrolysis carbon black from waste tires to potassium ferrate is 1:0.2-5.

Preferably, the hypohalite comprises one or more selected from the group consisting of potassium hypofluorite, sodium hypofluorite, potassium hypochlorite, sodium hypochlorite, potassium hypobromite, sodium hypobromite, potassium hypoiodite and sodium hypoiodite.

Preferably, mechanical stirring is used during the reaction, and meantime, ultrasonic treatment is carried out; and the rotational speed of mechanical stirring is 200-800 r/m, the power of ultrasonic treatment is 100-200 w, the reaction time is 2-6 h, the reaction temperature is 40-90° C., and the time for standing is 6-12 h after the end of the reaction.

Preferably, the centrifugation speed is in a range of 5000-9000 r/m, and the centrifugation time is 3-6 min.

The present disclosure further provides a stably-dispersed pyrolysis carbon black/water suspension obtained by the above method.

In the present disclosure a stably-dispersed pyrolysis carbon black/water suspension in water is successfully obtained by means of alkali washing and oxidation. Not only the ash is obviously removed, but also the surface has more oxygen-containing functional groups, large structuredness and high reactivity; and the impurity removal and modification of pyrolysis carbon black are achieved.

Compared with the prior art, the present disclosure has the following advantages and effects:

1. According to the embodiment of the present disclosure, a large amount of ash on the surface of pyrolysis carbon black is removed by constructing a reaction system containing pyrolysis carbon black, potassium ferrate and alkali using the strong oxidizing property of potassium ferrate in an alkaline environment, and the reactivity of the surface of pyrolysis carbon black is improved to obtain pyrolysis carbon black which can be stably dispersed in water.

2. Hypohalite (e.g. sodium hypohalite) is added into a reaction system containing pyrolysis carbon black, potassium ferrate and alkali, and by using the redox reaction between sodium hypohalite and potassium ferrate, the regeneration and recycling of ferrate ions in waste liquid are achieved ($2FeCl_3+10NaOH+3NaClO=2Na_2FeO_4+9NaCl+5H_2O$), reducing the cost of raw materials and the pollution to the environment.

3. The potassium ferrate oxidant used is an environmentally friendly reagent with little pollution to the environment and an industrial product with low price, has strong oxidizability in the alkaline environment, and can exist stably for a long time. This chemical reaction characteristic provides conditions for oxidative modification of pyrolysis carbon black.

4. Alkali added in the reaction system not only provides an alkaline environment for potassium ferrate in the reaction system, but also plays a role in removing impurities, that is, removing ash from pyrolysis carbon black.

5. The hypohalite used is also an environmentally friendly reagent with little pollution to the environment and an industrial product with low price.

It should be understood that the general description above and the detailed description below are only illustrative and explanatory and cannot limit the disclosure.

4

BRIEF DESCRIPTION OF THE DRAWINGS

FIG. 1 shows a diagram of natural sedimentation experiment results of pyrolysis carbon black suspension in Example 1 at different pH values.

DETAILED DESCRIPTION OF THE INVENTION

The present disclosure will be further described in detail through examples below, but the scope of protection of the present disclosure is not limited to the contents.

The method comprises: dispersing pyrolysis carbon black from waste tires in an alkaline solution of potassium ferrate, adding hypohalite, leaving the resulting mixture to stand for deposition, and centrifuging and washing the sediment to obtain a stably-dispersed pyrolysis carbon black/water suspension.

In order to achieve the recycling of waste liquid, in a possible embodiment, the method further comprises: collecting and mixing the supernatant obtained after deposition and the supernatant obtained after centrifugation, then dispersing the pyrolysis carbon black from waste tires in the mixed waste liquid, adding hypohalite in stages in the reaction process, leaving the resulting mixture to stand for deposition, and centrifuging and washing the sediment to obtain the stably-dispersed pyrolysis carbon black/water suspension.

In a possible embodiment, when the alkaline solution of potassium ferrate is prepared, the alkali used comprises one or more selected from the group consisting of sodium hydroxide, potassium hydroxide, calcium hydroxide, magnesium hydroxide, barium hydroxide, aluminum hydroxide, zinc hydroxide, copper hydroxide, potassium bicarbonate and sodium bicarbonate; and the alkaline solution has a concentration of 0.1-5 M.

In a possible embodiment, the potassium ferrate has a mass percentage concentration of 2-10% in the alkaline solution of potassium ferrate.

In a possible embodiment, the hypohalite has a mass percentage concentration of 20-30% in the hypohalite solution, and the volume ratio of the alkaline solution of potassium ferrate to the hypohalite is 2-10:1; and a method for adding the hypohalite is as follows: the hypohalite is added twice on average, wherein the hypohalite is added once 1 h after the start of the reaction, and the remaining hypohalite is added 1 h before the end of the reaction.

In a possible embodiment, the mass ratio of pyrolysis carbon black from waste tires to potassium ferrate is 1:0.2-5.

In a possible embodiment, the hypohalite comprises one or more selected from the group consisting of potassium hypofluorite, sodium hypofluorite, potassium hypochlorite, sodium hypochlorite, potassium hypobromite, sodium hypobromite, potassium hypoiodite and sodium hypoiodite.

In a possible embodiment, mechanical stirring is used during the reaction, and meantime, ultrasonic treatment is carried out; and the rotational speed of mechanical stirring is 200-800 r/m, the power of ultrasonic treatment is 100-200 w, the reaction time is 2-6 h, the reaction temperature is 40-90° C., and the time for standing is 6-12 h after the end of the reaction.

In a possible embodiment, the centrifugation speed is in a range of 5000-9000 r/m, and the centrifugation time is 3-6 min.

Example 1

4 g of pyrolysis carbon black from waste tires was dispersed in an alkaline solution of potassium ferrate to perform impurity removal and modification, wherein the alkaline solution of potassium ferrate was composed of 200 mL of deionized water, 4 g of potassium ferrate and 4 g of sodium hydroxide, and the process of dispersing pyrolysis carbon black from waste tires in the alkaline solution of potassium ferrate to perform impurity removal and modification was as follows: 4 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% sodium hypochlorite solution was added 1 h after the start of the reaction, and 50 mL of sodium hypochlorite solution with the same concentration was added again 1 h before the end of the reaction.

The pyrolysis carbon black suspension obtained after reaction was poured into a beaker and left to stand for 10 h, and the suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

FIG. 1 shows a diagram of natural sedimentation experiment results of pyrolysis carbon black suspension in Example 1 at different pH values. The pyrolysis carbon black suspension obtained after impurity removal and modification can exist stably under weak acid and alkaline conditions, indicating that a certain amount of oxygen-containing functional groups was introduced on the surface of pyrolysis carbon black by oxidation in the presence of the alkaline reaction system of potassium ferrate solution.

Example 2

8 g of pyrolysis carbon black from waste tires was dispersed in an alkaline solution of potassium ferrate to perform impurity removal and modification, wherein the alkaline solution of potassium ferrate was composed of 200 mL of deionized water, 8 g of potassium ferrate and 4 g of sodium hydroxide, and the process of dispersing pyrolysis carbon black from waste tires in the alkaline solution of potassium ferrate to perform impurity removal and modification was as follows: 8 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% sodium hypochlorite solution was added 1 h after the start of the reaction, and 50 mL of sodium hypochlorite solution with the same concentration was added again 1 h before the end of the reaction.

The pyrolysis carbon black suspension obtained after reaction was poured into a beaker and left to stand for 10 h, and the suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 3

10 g of pyrolysis carbon black from waste tires was dispersed in an alkaline solution of potassium ferrate to perform impurity removal and modification, wherein the alkaline solution of potassium ferrate was composed of 200 mL of deionized water, 10 g of potassium ferrate and 4 g of sodium hydroxide, and the process of dispersing pyrolysis carbon black from waste tires in the alkaline solution of potassium ferrate to perform impurity removal and modification was as follows: 10 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% sodium hypochlorite solution was added 1 h after the start of the reaction, and 50 mL of sodium hypochlorite solution with the same concentration was added again 1 h before the end of the reaction.

The pyrolysis carbon black suspension obtained after reaction was poured into a beaker and left to stand for 10 h, and the suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 4

15 g of pyrolysis carbon black from waste tires was dispersed in an alkaline solution of potassium ferrate to perform impurity removal and modification, wherein the alkaline solution of potassium ferrate was composed of 200 mL of deionized water, 15 g of potassium ferrate and 4 g of sodium hydroxide, and the process of dispersing pyrolysis carbon black from waste tires in the alkaline solution of potassium ferrate to perform impurity removal and modification was as follows: 15 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of sodium hypochlorite solution was added 1 h after the start of the reaction, and 50 mL of sodium hypochlorite solution was added again 1 h before the end of the reaction.

The pyrolysis carbon black suspension obtained after reaction was poured into a beaker and left to stand for 10 h, and the suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 5

20 g of pyrolysis carbon black from waste tires was dispersed in an alkaline solution of potassium ferrate to perform impurity removal and modification, wherein the alkaline solution of potassium ferrate was composed of 200 mL of deionized water, 20 g of potassium ferrate and 4 g of sodium hydroxide, and the process of dispersing pyrolysis carbon black from waste tires in the alkaline solution of potassium ferrate to perform impurity removal and modification was as follows: 20 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% sodium hypochlorite solution was added 1 h after the start of the reaction, and 50 mL of sodium hypochlorite solution with the same concentration was added again 1 h before the end of the reaction.

The pyrolysis carbon black suspension obtained after reaction was poured into a beaker and left to stand for 10 h, and the suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 6

8 g of pyrolysis carbon black from waste tires was dispersed in an alkaline solution of potassium ferrate to perform impurity removal and modification, wherein the alkaline solution of potassium ferrate was composed of 200 mL of deionized water, 8 g of potassium ferrate and 4 g of potassium hydroxide, and the process of dispersing pyrolysis carbon black from waste tires in the alkaline solution of potassium ferrate to perform impurity removal and modification was as follows: 8 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% sodium hypochlorite solution was added 1 h after the start of the reaction, and 50 mL of sodium hypochlorite solution with the same concentration was added again 1 h before the end of the reaction.

The pyrolysis carbon black suspension obtained after reaction was poured into a beaker and left to stand for 10 h, and the suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 7

8 g of pyrolysis carbon black from waste tires was dispersed in an alkaline solution of potassium ferrate to perform impurity removal and modification, wherein the alkaline solution of potassium ferrate was composed of 200 mL of deionized water, 8 g of potassium ferrate and 4 g of magnesium hydroxide, and the process of dispersing pyrolysis carbon black from waste tires in the alkaline solution of potassium ferrate to perform impurity removal and modification was as follows: 8 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% sodium hypochlorite solution was added 1 h after the start of the reaction, and 50 mL of sodium hypochlorite solution with the same concentration was added again 1 h before the end of the reaction.

The pyrolysis carbon black suspension obtained after reaction was poured into a beaker and left to stand for 10 h, and the suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 8

8 g of pyrolysis carbon black from waste tires was dispersed in an alkaline solution of potassium ferrate to perform impurity removal and modification, wherein the alkaline solution of potassium ferrate was composed of 200 mL of deionized water, 8 g of potassium ferrate and 4 g of calcium hydroxide, and the process of dispersing pyrolysis carbon black from waste tires in the alkaline solution of potassium ferrate to perform impurity removal and modification was as follows: 8 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% sodium hypochlorite solution was added 1 h after the start of the reaction, and 50 mL of sodium hypochlorite solution with the same concentration was added again 1 h before the end of the reaction.

The pyrolysis carbon black suspension obtained after reaction was poured into a beaker and left to stand for 10 h, and the suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 9

8 g of pyrolysis carbon black from waste tires was dispersed in an alkaline solution of potassium ferrate to perform impurity removal and modification, wherein the alkaline solution of potassium ferrate was composed of 200 mL of deionized water, 8 g of potassium ferrate and 4 g of aluminium hydroxide, and the process of dispersing pyrolysis carbon black from waste tires in the alkaline solution of potassium ferrate to perform impurity removal and modification was as follows: 8 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% sodium hypochlorite solution was added 1 h after the start of the reaction, and 50 mL of sodium hypochlorite solution with the same concentration was added again 1 h before the end of the reaction.

The pyrolysis carbon black suspension obtained after reaction was poured into a beaker and left to stand for 10 h. The suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 10

8 g of pyrolysis carbon black from waste tires was dispersed in an alkaline solution of potassium ferrate to perform impurity removal and modification, wherein the alkaline solution of potassium ferrate was composed of 200 mL of deionized water, 8 g of potassium ferrate and 4 g of zinc hydroxide, and the process of dispersing pyrolysis carbon black from waste tires in the alkaline solution of potassium ferrate to perform impurity removal and modification was as follows: 8 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% sodium hypochlorite solution was added 1 h after the start of the reaction, and 50 mL of sodium hypochlorite solution with the same concentration was added again 1 h before the end of the reaction.

The pyrolysis carbon black suspension obtained after reaction was poured into a beaker and left to stand for 10 h. The suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 11

8 g of pyrolysis carbon black from waste tires was dispersed in an alkaline solution of potassium ferrate to perform impurity removal and modification, wherein the alkaline solution of potassium ferrate was composed of 200 mL of deionized water, 8 g of potassium ferrate and 4 g of sodium hydroxide, and the process of dispersing pyrolysis carbon black from waste tires in the alkaline solution of potassium ferrate to perform impurity removal and modification was as follows: 8 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% potassium hypochlorite solution was added 1 h after the start of the reaction, and 50 mL of potassium hypochlorite solution with the same concentration was added again 1 h before the end of the reaction.

The pyrolysis carbon black suspension obtained after reaction was poured into a beaker and left to stand for 10 h. The suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 12

8 g of pyrolysis carbon black from waste tires was dispersed in an alkaline solution of potassium ferrate to perform impurity removal and modification, wherein the alkaline solution of potassium ferrate was composed of 200 mL of deionized water, 8 g of potassium ferrate and 4 g of sodium hydroxide, and the process of dispersing pyrolysis carbon black from waste tires in the alkaline solution of potassium ferrate to perform impurity removal and modification was as follows: 8 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% sodium hypobromite solution was added 1 h after the start of the reaction, and 50 mL of sodium hypobromite solution with the same concentration was added again 1 h before the end of the reaction.

The pyrolysis carbon black suspension obtained after reaction was poured into a beaker and left to stand for 10 h. The suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 13

8 g of pyrolysis carbon black from waste tires was dispersed in an alkaline solution of potassium ferrate to perform impurity removal and modification, wherein the alkaline solution of potassium ferrate was composed of 200 mL of deionized water, 8 g of potassium ferrate and 4 g of sodium hydroxide, and the process of dispersing pyrolysis carbon black from waste tires in the alkaline solution of potassium ferrate to perform impurity removal and modification was as follows: 8 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% potassium hypobromite solution was added 1 h after the start of the reaction, and 50 mL of potassium hypobromite solution with the same concentration was added again 1 h before the end of the reaction.

The pyrolysis carbon black suspension obtained after reaction was poured into a beaker and left to stand for 10 h. The suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 14

8 g of pyrolysis carbon black from waste tires was dispersed in an alkaline solution of potassium ferrate to perform impurity removal and modification, wherein the alkaline solution of potassium ferrate was composed of 200 mL of deionized water, 8 g of potassium ferrate and 4 g of sodium hydroxide, and the process of dispersing pyrolysis carbon black from waste tires in the alkaline solution of potassium ferrate to perform impurity removal and modification was as follows: 8 g of pyrolysis carbon black from waste tires was dispersed in the alkaline solution of potassium ferrate, and mechanical stirring and ultrasonic treatment were performed at the same time in a water bath at 80° C., wherein the rotational speed of mechanical stirring was 300 r/m and the power of ultrasonic treatment was 140 w; and the reaction process of alkaline washing and oxidation lasted for 3 h, 50 mL of 30% sodium hypoiodite solution was added 1 h after the start of the reaction, and 50 mL of sodium hypoiodite solution with the same concentration was added again 1 h before the end of the reaction.

The pyrolysis carbon black suspension obtained after reaction was poured into a beaker and left to stand for 10 h. The suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Example 15

8 g of pyrolysis carbon black from waste tires was dispersed in an alkaline solution of potassium ferrate to perform impurity removal and modification, wherein the alkaline solution of potassium ferrate was composed of 200 mL of deionized water, 8 g of potassium ferrate and 4 g of sodium hydroxide, and the process of dispersing pyrolysis carbon black from waste tires in the alkaline solution of potassium ferrate to perform impurity removal and modification was as follows: 8 g of pyrolysis carbon black from waste tires was dispersed in the alkaline solution of potassium ferrate, and mechanical stirring and ultrasonic treatment were performed at the same time in a water bath at 80°

C., wherein the rotational speed of mechanical stirring was 300 r/m and the power of ultrasonic treatment was 140 w; and the reaction process of alkaline washing and oxidation lasted for 3 h, 50 mL of 30% potassium hypoiodite solution was added 1 h after the start of the reaction, and 50 mL of potassium hypoiodite solution with the same concentration was added again 1 h before the end of the reaction.

The pyrolysis carbon black suspension obtained after reaction was poured into a beaker and left to stand for 10 h. The suspension was deposited. The black sediment was centrifuged with a high-speed centrifuge at 8000 r/m for 5 min, and then the upper reddish-brown waste liquid obtained after deposition and centrifugation was recycled for cycle use, deionized water was finally added to the black sediment, and the resulting mixture was centrifuged three times to obtain a stably-dispersed pyrolysis carbon black/aqueous suspension.

Table 1 shows the chemical compositions of pyrolysis carbon black obtained before modification and the pyrolysis carbon blacks obtained after impurity removal and modification in Examples 1-15. From the change of elements in the table, the ash content of calcium, zinc, silicon and sulfur was indeed decreased, indicating that the alkaline system of the potassium ferrate solution had certain effect on the impurity removal and modification of the pyrolysis carbon black. Table 2 shows the Zeta potentials of pyrolysis carbon black obtained before modification and the pyrolysis carbon blacks obtained after impurity removal and modification in Examples 1-15. As can be seen from the table, the Zeta potential of the pyrolysis carbon black suspension obtained after modification is increased, and the alkaline system of the potassium ferrate solution has an obvious effect on the oxidation modification and quality improvement of the pyrolysis carbon black.

TABLE 1

The chemical compositions of pyrolysis carbon black obtained before modification and the pyrolysis carbon blacks obtained after impurity removal and modification in Examples 1-15

| Elements | C | O | Ca | Zn | Si | S |
|---|---|---|---|---|---|---|
| Pyrolysis carbon black before modification | 68.96 | 13.67 | 9.37 | 4.41 | 1.84 | 1.75 |
| Example 1 | 81.78 | 13.53 | — | 0.51 | 0.29 | 0.25 |
| Example 2 | 84.9 | 12.28 | — | 0.27 | 0.3 | 0.25 |
| Example 3 | 70.74 | 21.12 | 0.98 | 0.47 | 0.81 | 0.36 |
| Example 4 | 69.79 | 17.69 | — | 1.59 | 2.31 | 0.92 |
| Example 5 | 79.88 | 14.01 | 1.71 | 0.33 | 1.20 | 0.45 |
| Example 6 | 80.34 | 13.23 | 1.32 | 0.43 | 0.62 | 0.94 |
| Example 7 | 79.89 | 14.67 | 1.24 | 0.65 | 0.71 | 0.83 |
| Example 8 | 81.22 | 15.56 | — | 0.71 | 0.78 | 0.61 |
| Example 9 | 81.11 | 13.23 | 1.21 | 0.86 | 0.53 | 0.93 |
| Example 10 | 80.34 | 14.22 | 1.01 | 0.67 | 0.67 | 0.66 |
| Example 11 | 79.76 | 14.37 | — | 1.78 | 0.67 | 0.72 |
| Example 12 | 80.55 | 14.23 | 1.56 | 0.56 | — | 0.76 |
| Example 13 | 80.21 | 13.04 | 1.12 | 0.55 | 0.89 | 0.71 |
| Example 14 | 79.33 | 15.32 | — | 0.65 | 0.78 | 0.57 |
| Example 15 | 80.66 | 13.12 | 1.01 | 0.33 | 0.68 | 0.66 |

TABLE 2

The Zeta potentials of pyrolysis carbon black obtained before modification and the pyrolysis carbon blacks obtained after impurity removal and modification in Examples 1-15

| | Zeta (mV) |
|---|---|
| Pyrolysis carbon black before modification | −14 |
| Example 1 | −20.24 |
| Example 2 | −22.25 |

TABLE 2-continued

The Zeta potentials of pyrolysis carbon black obtained before
modification and the pyrolysis carbon blacks obtained after
impurity removal and modification in Examples 1-15

| | Zeta (mV) |
|---|---|
| Example 3 | −20.30 |
| Example 4 | −25.48 |
| Example 5 | −25.69 |
| Example 6 | −20.25 |
| Example 7 | −21.13 |
| Example 8 | −20.05 | modification of pyrolysis carbon black with original liquid in Example 16 and after the recycling of the pyrolysis carbon black modified by the waste liquid in Example 16. From the test results of Zeta potential in the table, it can be seen that the waste liquid was recycled for seven times; and with the increase of the number of times of recycling, the Zeta potential of the modified pyrolysis carbon black suspension was increased and remained at about −22 mV, indicating that the effect of modifying pyrolysis carbon black with the waste liquid was roughly the same as that of the alkaline system of potassium ferrate constructed for the first time, thereby achieving the recycling of the waste liquid from the alkaline reaction system of the potassium ferrate reagent.

TABLE 3

The Zeta potentials before the modification of pyrolysis carbon black with original liquid, after
the modification of pyrolysis carbon black with original liquid in Example 16 and after the recycling
of the pyrolysis carbon black modified by the waste liquid in Example 16

| | Before modification of pyrolysis carbon black with original liquid | After modification of pyrolysis carbon black with original liquid | Number of Times of recycling of waste liquid for modification of pyrolysis carbon black | | | | | | |
|---|---|---|---|---|---|---|---|---|---|
| | | | 1 | 2 | 3 | 4 | 5 | 6 | 7 |
| Zeta (mV) | −14 | −25.39 | −25.26 | −22.78 | −20.50 | −20 | −20.49 | −22.17 | −24.84 |

TABLE 2-continued

The Zeta potentials of pyrolysis carbon black obtained before
modification and the pyrolysis carbon blacks obtained after
impurity removal and modification in Examples 1-15

| | Zeta (mV) |
|---|---|
| Example 9 | −21.04 |
| Example 10 | −21.27 |
| Example 11 | −21.45 |
| Example 12 | −20.37 |
| Example 13 | −20.78 |
| Example 14 | −21.61 |
| Example 15 | −21.17 |

Example 16

8 g of pyrolysis carbon black was placed in the reddish-brown waste liquid collected after the end of the above reaction, and mechanical stirring and ultrasonic treatment were performed in a water bath at 80° C., with a rotational speed of mechanical stirring of 300 r/m and a power of ultrasonic treatment of 140 w; the reaction process of alkaline washing and oxidation lasted for 3 h, 50 mL of 30% sodium hypochlorite solution was added 1 h after the start of the reaction, and 50 mL of sodium hypochlorite solution with the same concentration was added again 1 h before the end of the reaction. The pyrolysis carbon black suspension obtained after reaction was poured into a beaker and left to stand for 10 h. The suspension was deposited. The black sediment was centrifuged with a high-speed centrifuge at 8000 r/m for 5 min, and then the upper reddish-brown settled solution was recycled for cycle use, deionized water was finally added to the black sediment, and the resulting mixture was centrifuged three times to obtain a stably-dispersed pyrolysis carbon black/aqueous suspension. After the reaction was completed, the waste liquid was repeatedly used according to the above steps, and impurity removal and modification of pyrolysis carbon black were performed, wherein the waste liquid was recycled 7 times.

Table 3 shows the Zeta potentials before the modification of pyrolysis carbon black with original liquid, after the The present disclosure has been disclosed above with reference to several examples, so that a person of ordinary skill in the art can understand the present disclosure. A person skilled in the art can use the present disclosure as a basis to design or adjust other processes and structures to implement the same purpose of the examples and/or achieve the same advantages of the examples. A person skilled in the art should understand that the above equivalent substitutions do not deviate from the concept and scope of the present disclosure, and these different changes, substitutions, and adjustments can be made without deviating from the concept and scope of the present disclosure.

The invention claimed is:

1. A method for impurity removal and modification of carbon black obtained from waste tire pyrolysis, comprising: dispersing carbon black obtained from waste tire pyrolysis in an alkaline solution of potassium ferrate to perform a reaction, adding hypohalite in stages during the reaction, leaving the resulting mixture to stand for layer separation, and centrifuging and washing sediment to obtain a stably-dispersed carbon black/water suspension.

2. The method for impurity removal and modification of carbon black obtained from waste tire pyrolysis according to claim 1, wherein the method further comprises: collecting and mixing the supernatant obtained after layer separation and the supernatant obtained after centrifugation, then dispersing the carbon black obtained from waste tires in the mixed waste liquid, adding hypohalite in stages during the reaction, leaving the resulting mixture to stand for layer separation, and centrifuging and washing sediment to obtain the stably-dispersed carbon black/water suspension.

3. The method for impurity removal and modification of carbon black obtained from waste tire pyrolysis according to claim 1, wherein when the alkaline solution of potassium ferrate is prepared, the alkali used comprises one or more selected from the group consisting of sodium hydroxide, potassium hydroxide, calcium hydroxide, magnesium hydroxide, barium hydroxide, aluminum hydroxide, zinc hydroxide, copper hydroxide, potassium bicarbonate and sodium bicarbonate; and the alkaline solution has a concentration of 0.1-5 M.

4. The method for impurity removal and modification of carbon black obtained from waste tire pyrolysis according to claim 1, wherein the potassium ferrate has a mass percentage concentration of 2-10% in the alkaline solution of potassium ferrate.

5. The method for impurity removal and modification of carbon black obtained from waste tire pyrolysis according to claim 1, wherein the hypohalite has a mass percentage concentration of 20-30% in the hypohalite solution, and the volume ratio of the alkaline solution of potassium ferrate to the hypohalite is 2-10:1; and a method for adding the hypohalite is as follows: the hypohalite is added twice on average, wherein the hypohalite is added once 1 h after the start of the reaction, and the remaining hypohalite is added 1 h before the end of the reaction.

6. The method for impurity removal and modification of carbon black obtained from waste tire pyrolysis according to claim 1, wherein the mass ratio of the carbon black obtained from waste tire pyrolysis to the potassium ferrate is 1:0.2-5.

7. The method for impurity removal and modification of carbon black obtained from waste tire pyrolysis according to claim 1, wherein the hypohalite comprises one or more selected from the group consisting of potassium hypofluorite, sodium hypofluorite, potassium hypochlorite, sodium hypochlorite, potassium hypobromite, sodium hypobromite, potassium hypoiodite and sodium hypoiodite.

8. The method for impurity removal and modification of carbon black obtained from waste tire pyrolysis according to claim 1, wherein mechanical stirring is used during the reaction, and meantime, ultrasonic treatment is carried out; and the rotational speed of mechanical stirring is 200-800 r/m, the power of ultrasonic treatment is 100-200 w, the reaction time is 2-6 h, the reaction temperature is 40-90° C., and the time for standing is 6-12 h after the end of the reaction.

9. The method for impurity removal and modification of carbon black obtained from waste tire pyrolysis according to claim 1, wherein the centrifugation speed is in a range of 5000-9000 r/m, and the centrifugation time is 3-6 min.

* * * * *